(12) United States Patent
Larsson et al.

(10) Patent No.: US 7,926,377 B2
(45) Date of Patent: Apr. 19, 2011

(54) DEVICE FOR AN INDUSTRIAL ROBOT

(75) Inventors: Jan Larsson, Vasteras (SE); Stefan Danielsson, Västerås (SE); Mats Olsson, Västerås (SE)

(73) Assignee: ABB AB (SE)

( * ) Notice: Subject to any disclaimer, the term of this patent is extended or adjusted under 35 U.S.C. 154(b) by 0 days.

(21) Appl. No.: 12/255,414

(22) Filed: Oct. 21, 2008

(65) Prior Publication Data

US 2009/0095104 A1  Apr. 16, 2009

Related U.S. Application Data

(63) Continuation of application No. PCT/IB2007/052398, filed on Apr. 23, 2007.

(60) Provisional application No. 60/793,724, filed on Apr. 21, 2006.

(51) Int. Cl.
  *F16H 55/18* (2006.01)
  *F16H 1/14* (2006.01)
  *B25J 17/00* (2006.01)

(52) U.S. Cl. ........... 74/409; 74/417; 74/490.06; 901/26; 901/29

(58) Field of Classification Search ............ 74/409, 74/416, 417, 423, 459.5, 396, 399, 490.01, 74/490.06; 384/252, 260, 583, 255, 447, 384/519; 901/28, 29, 25, 26
See application file for complete search history.

(56) References Cited

U.S. PATENT DOCUMENTS

| | | | | |
|---|---|---|---|---|
| 1,815,450 A * | 7/1931 | Schmal | ............................. | 74/500 |
| 2,996,929 A | 8/1961 | Lazarowicz | | |
| 3,826,151 A | 7/1974 | F'Geppert | | |
| 3,977,268 A * | 8/1976 | Seabrook | ........................ | 74/417 |
| 4,580,460 A | 4/1986 | Chang et al. | | |
| 4,917,511 A * | 4/1990 | Katsube | ......................... | 384/540 |
| 4,976,165 A | 12/1990 | Nagahama | | |
| 5,097,718 A * | 3/1992 | Sahara | ............................. | 74/396 |
| 5,743,145 A | 4/1998 | Terada et al. | | |
| 5,775,975 A * | 7/1998 | Mizuno et al. | ................... | 451/47 |
| 5,924,330 A * | 7/1999 | Danielsson et al. | ........ | 74/490.06 |
| 6,339,967 B1 | 1/2002 | Tanaka et al. | | |
| 6,398,400 B1 * | 6/2002 | Nienhaus | ........................ | 384/255 |
| 6,550,567 B2 * | 4/2003 | Murakami et al. | ............ | 180/444 |
| 6,651,522 B2 * | 11/2003 | Petocchi et al. | ............. | 74/421 A |

FOREIGN PATENT DOCUMENTS

| EP | 0089129 A2 | 9/1983 |
|---|---|---|
| EP | 0130539 A2 | 1/1985 |
| JP | 58005556 | * 1/1983 |
| JP | 58005556 A | 1/1983 |

OTHER PUBLICATIONS

International Search Report, PCT/IB2007/052398, Nov. 27, 2007, 3 Pages.
Written Opinion of the International Search Authority, Nov. 27, 2007, 7 Pages.

* cited by examiner

*Primary Examiner* — James Pilkington
(74) *Attorney, Agent, or Firm* — St. Onge Steward Johnston & Reens LLC (57) ABSTRACT

A device for adjusting the backlash in bevel gears in an industrial robot which includes a first conical gear wheel with a first axis of rotation and a second conical gear wheel. The device includes a displaceably arranged holder member adapted to fix and rotatably journal the first gear wheel for rotation about the first axis of rotation.

18 Claims, 8 Drawing Sheets

DEVICE FOR AN INDUSTRIAL ROBOT

CROSS-REFERENCE TO RELATED APPLICATIONS

The present application is a continuation of pending International patent application PCT/IB2007/052398 filed on Apr. 23, 2007, which designates the United States and claims the benefit under 35 U.S.C. §119 (e) of the U.S. Provisional Patent Application Ser. No. 60/793,724 filed on Apr. 21, 2006. All prior applications are herein incorporated by reference in their entirety.

FIELD OF THE INVENTION

The present invention relates to a method for adjustment of backlash in an industrial robot.

BACKGROUND OF THE INVENTION

An industrial robot comprises a manipulator and control equipment. The manipulator comprises at least one robot arm comprising a number of arm parts with connecting joints, where the axes of rotation of the joints define the degrees of freedom of the robot. As an example may be mentioned a six-axis robot which usually has a fixed foot, a stand that is arranged on the foot and that is rotatable about a first axis, and a first robot arm that is rotatable in relation to the stand about a second axis. At the outer end of the first robot arm, a second robot arm is rotatably journalled for rotation about a third axis. This second arm is rotatable about a fourth axis, its own longitudinal axis, and at its outer end supports a robot hand provided with a tool attachment, said robot hand being rotatable in two degrees of freedom about a fifth and a sixth axis, respectively, relative to the second arm.

The movements of the manipulator are made possible by the arrangement of drive means that bring about rotary motions in the respective joints. Each drive means comprises an electric motor and a reduction gear. The power supply and the control of an industrial robot of the kind mentioned above are carried out by control equipment, which is not described in more detail in this context.

The working range and the capacity for movement of a manipulator depend, among other things, on the reduction gears included. An additional factor that is influenced by the reduction gears is the performance of a robot with respect to precision and/or accuracy. When manufacturing industrial robots, the aim is to arrive at design solutions which enable reducing the total built-in backlash from the gears included therein as much as possible.

According to prior art (FIG. 12) in the form of a wrist for an industrial robot, spacers, also called shims, are used to eliminate the backlash from the gears. The method comprises the steps of calculating in advance how large the backlash will be, building together the manipulator/the wrist and then measuring the actual remaining backlash. When the calculation does not correspond to the physical result, the manipulator/wrist must be detached and the process started over again with a new, hopefully more correct calculation. This is a time-consuming and expensive process.

For the above reasons, there is a need of a simple and rapid method to be able to adjust the backlash when mounting gears in a manipulator. This need cannot be satisfied by the prior art.

SUMMARY OF THE INVENTION

The object of the present invention is to make possible a rapid and simple adjustment of backlash when installing gears in an industrial robot.

According to a first aspect of the invention, there is provided a device for adjusting the backlash in a gearing with intersecting axes [also referred to below as bevel gears] in an industrial robot. The gearing comprises a first conical gear wheel with a third axis of rotation and a second conical gear wheel with a first axis of rotation, which forms a right angle with the third axis of rotation. The device comprises a displaceably arranged holder member adapted to fix and rotatably journal the first gear wheel for rotation about the third axis of rotation, which is arranged in parallel with the second axis of rotation.

In an alternative embodiment according to the present invention, the holder member is arranged linearly displaceable in a direction C, which is parallel to the axis of rotation I.

In an alternative embodiment, the gearing is a hypoid gearing.

In an alternative embodiment, the first conical gear wheel is a pinion.

In an alternative embodiment, the holder member has a continuous channel.

In an alternative embodiment, the pinion is journalled so as to be fixed in a continuous channel for rotating about the first axis of rotation A.

The inventive concept includes a wrist comprising a device for adjusting the backlash in bevel gears included in the wrist.

An alternative embodiment of the device comprises a holder for the pinion, which is adapted to displace the pinion linearly in relation to the gear wheel and hence to adjust the backlash between the teeth of the pinion and the gear wheel.

In an alternative embodiment of the device, a tool is adapted to rotatably hold and linearly displace a first gear wheel in a direction perpendicular to the axis of rotation of the gear wheel.

According to a second aspect of the invention, there is provided a method for adjusting the backlash in a gearing included in an industrial robot, said gearing comprising a first conical gear wheel with a first direction of rotation and a second conical gear wheel. The invention is characterized in that the first gear wheel is brought to be displaced in a radial direction parallel to the first rotational direction.

The inventive concept comprises displacing the first gear wheel and fixing it rotatably so that the backlash in the gearing between the first and second gear wheels is eliminated.

The present intention enables an operator to safely install a toothed gearing in a manipulator and then to be certain that the built-in backlash is adjusted and eliminated directly when mounting the manipulator.

It is part of the inventive concept that the bevel gears be mounted adjacent to any of the shafts in an industrial robot.

BRIEF DESCRIPTION OF THE DRAWINGS

FIG. 11 is identical with FIG. 10 with the addition of an external tool, and, FIG. 12 is the prior art.

DETAILED DESCRIPTION OF THE INVENTION

Figure 1:
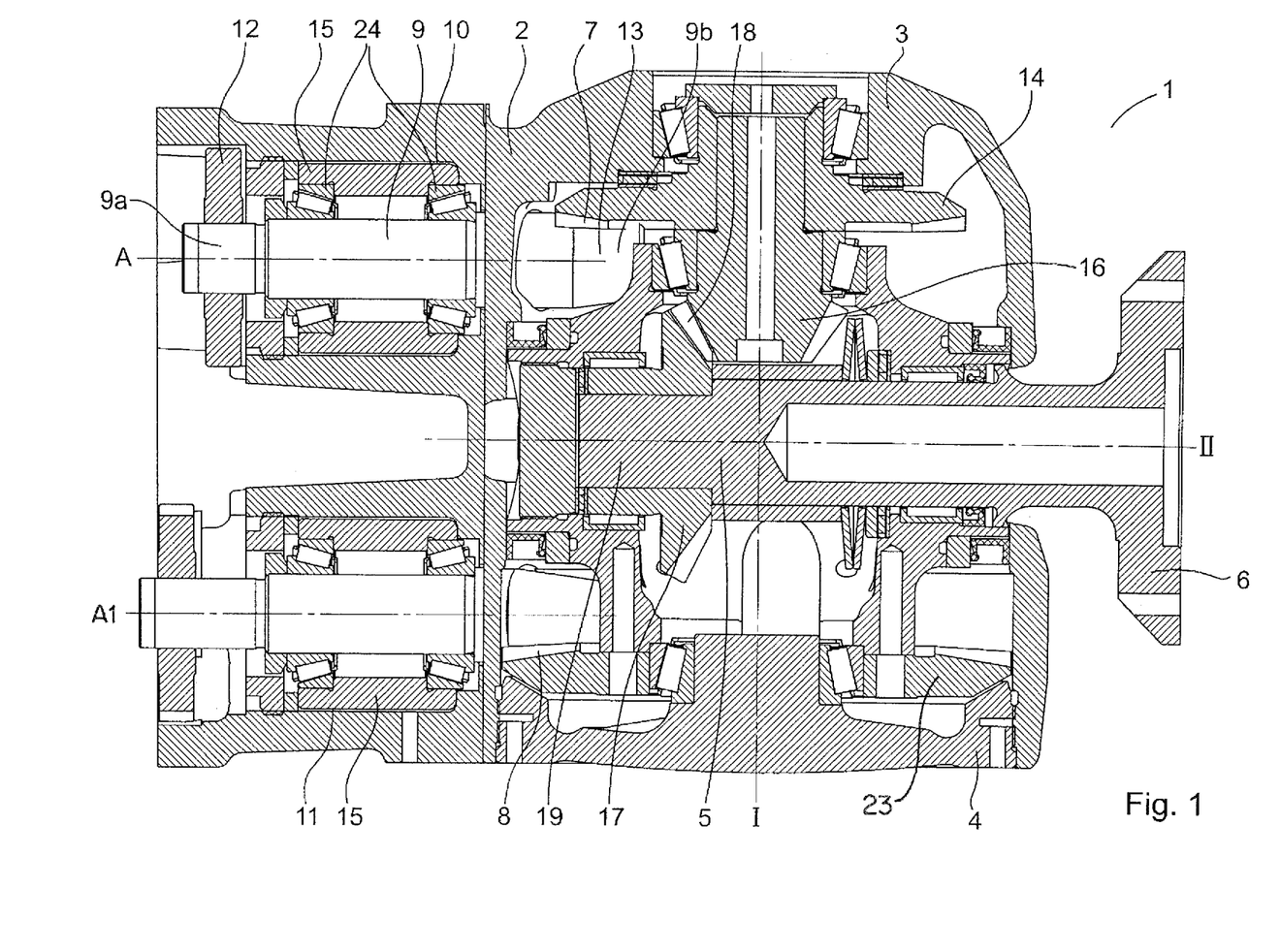
FIG. 1 is a cross section through a robot wrist comprising a gearing according to the present invention.

FIG. 1 is a wrist 1 in an industrial robot. The fundamental structure of the wrist 1 comprises an outer fork-shaped wrist housing 2 with two fork branches 3, 4. The wrist housing 2 accommodates a so-called tilt housing 5 journalled for rotation about a first axis of rotation I. The tilt housing supports, in a manner known per se, a turn disc 6 rotatably journalled about a second axis of rotation II, on which turn disc a robot tool may be mounted (not shown). The first axis of rotation I is arranged perpendicular to the second axis of rotation II. The wrist comprises first bevel gears 7 for transmitting a rotary motion to the turn disc 6, said gears being described in detail below. The wrist 1 further comprises second bevel gears 8 for transmitting a rotary motion to the tilt 5, which is also described in detail below.

For transmitting the rotary motion to the turn disc 6, a first secondary drive shaft 9 is rotatably journalled in the wrist housing 2, said drive shaft extending through a first through-hole/a channel 10 arranged in the longitudinal direction of the housing with a third axis of rotation A arranged in parallel with the axis of rotation II of the turn disc. The first secondary drive shaft 9, which is axially and radially journalled across a first double row angular contact ball bearing 24, has an inlet end 9a on which is fixedly arranged a first cylindrical gear wheel 12, which engages with a cylindrical gear drive at the end of a first primary drive shaft (not shown), which may be inserted into the wrist housing, in the robot arm. The second, inner end 9b of the first secondary drive shaft is an outlet end which is formed as a first conical gear wheel 13 designed as a hypoid pinion. The first conical gear wheel 13, the hypoid pinion, is adapted to engage with a second conical gearwheel 14 designed as a hypoid wheel. The second conical gear wheel 14 is rotatably journalled about the first axis I, perpendicular to the longitudinal axis of the first secondary drive shaft 9 and located on the outside of the first conical gear wheel 13, viewed from the intersectional point of the first I and second II axes of rotation. The first 13 and second 14 conical gear wheels form the first bevel gears 7, which in the embodiment shown is a hypoid gearing. In the hub of the second conical gear wheel 14, a third conical gear drive 16 is rigidly attached. This gear drive 16 in turn engages with a fourth conical gear wheel 17 that is rotatably journalled in the tilt housing and rigidly connected to the centre shaft 19 of the turn disc. The third 16 and fourth 17 gear wheels form the third bevel gears 18.

Figure 2:
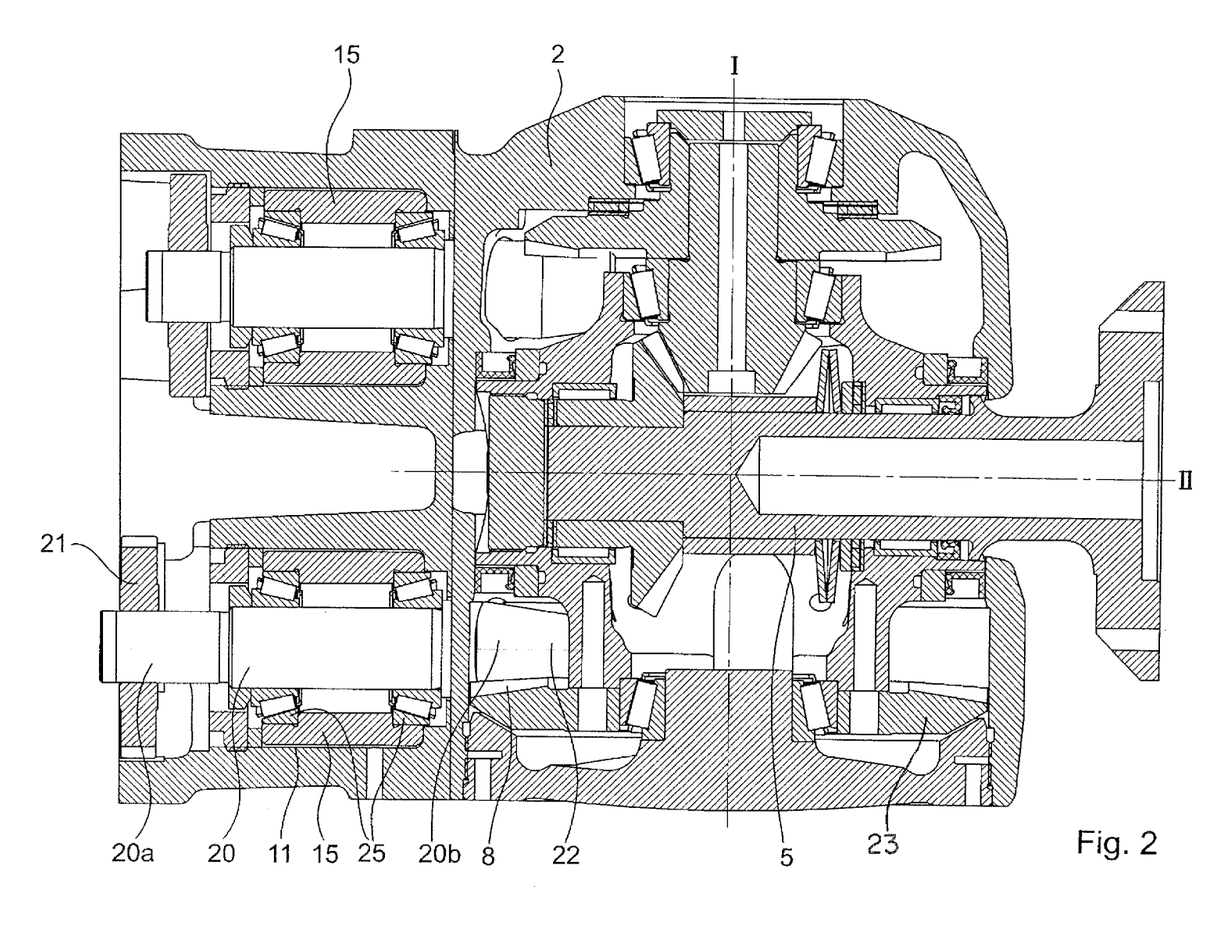
FIG. 2 is the same cross section as in FIG. 1.

For transmitting the rotary motion to the tilt 5, a second secondary drive shaft 20 is rotatably journalled in the wrist housing 2 in a similar manner (FIG. 2), said drive shaft 20 extending through a second through-hole/a channel 11 arranged in the longitudinal direction of the housing in parallel with the axis of rotation II of the turn disc in FIGS. 1 and 2. The second secondary drive shaft 20, which is axially and radially journalled across a second double row angular contact ball bearing 25, has an inlet end 20a on which is fixedly arranged a second cylindrical gear wheel 21, which engages with a cylindrical gear drive at the end of a second primary drive shaft (not shown), which may be inserted into the wrist housing, in the robot arm. The second, inner end 20b of the second secondary drive shaft 20 is an outlet end which is formed as a fifth conical gear wheel 22 designed as a hypoid pinion. The fifth conical gear wheel 22, the hypoid pinion, is adapted to engage with a sixth conical gear wheel 23 designed as a hypoid wheel. The sixth conical gear wheel 23 is fixedly mounted in the tilt housing 5 and rotatably journalled for rotation about the first axis I, perpendicular to the longitudinal axis A1 of the second secondary drive shaft 20 and located on the outside of the fifth conical gear wheel 22, viewed from the intersectional point of the first I and second II axes of rotation. The fifth 22 and sixth 23 conical gear wheels form the second bevel gears 8, which in the embodiment shown is a hypoid gearing.

Thus, for transmitting rotary motion to the tilt, a second primary drive shaft is arranged in the robot arm (not shown), and the rotary motion is thus transmitted via the second cylindrical gear wheel 21 to the second secondary drive shaft 20, which in turn, via the second bevel gears 8, sets the tilt housing 5 and hence also the turn disc 6 in rotation about the axis I.

FIGS. 1 and 2 is/shows the tilt 5 in a neutral position where the second axis of rotation II is coaxial, or parallel, to the centre axis of a primary drive shaft and the longitudinal axis about which the actual robot arm may rotate.

To be able to adjust the backlash in the first 7 and second 8 bevel gears, respectively, a holder device 15 is adapted to accommodate and rotatably journal the first 9 and second 20 secondary drive shafts, respectively.

Figure 3:
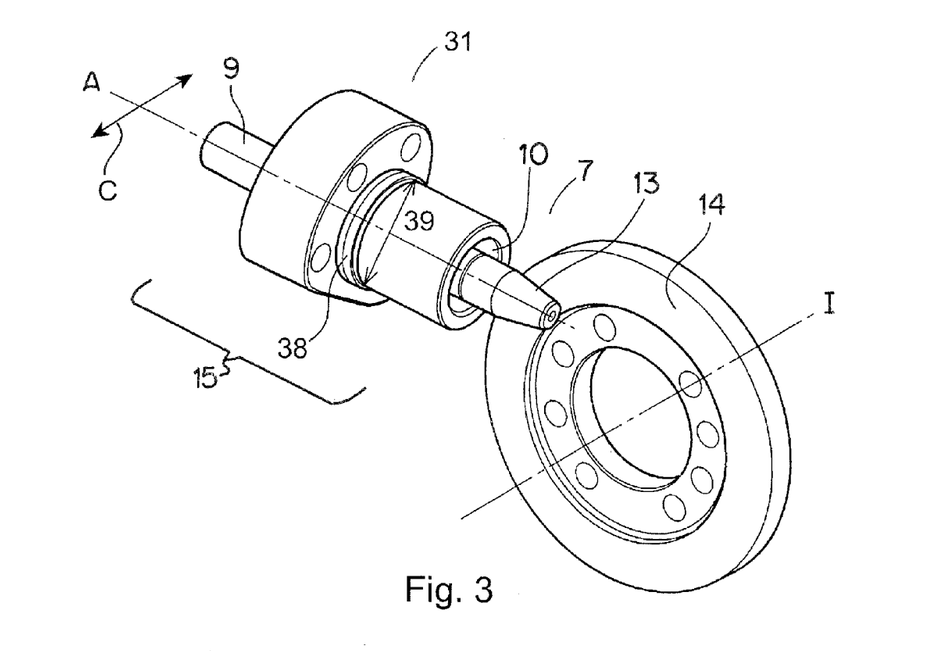
FIG. 3 is a device for elimination of backlash in bevel gears according to the present invention.

FIG. 3 shows a fundamental device 31 for adjusting gear backlash in bevel gears 7 in an industrial robot. The gearing 7 comprises a first conical gear wheel 13 fixedly mounted on a first shaft 9 for rotation about a first axis of rotation A. The longitudinal axis of the first shaft 9 coincides with the first axis of rotation A. A second conical gear wheel 14 is arranged for rotation about a second axis of rotation I. The gearing is arranged such that the first A and second I axes of rotation intersect each other at right angles. The device 31 comprises a displaceably arranged holder member 15 adapted to fix and rotatably journal the shaft 9 of the first gear wheel for rotation about the first axis of rotation A.

The holder member 15 is arranged linearly and radially displaceable in a direction C, which is parallel to the axis of rotation I of the second conical gear wheel 14. The bevel gears 7 in this embodiment constitute a hypoid gearing and the shaft 9 together with the first conical gear wheel 13 constitutes a pinion.

The holder member 15 is designed with a continuous channel 10, which is adapted to receive and accommodate the shaft 9. The shaft 9 is fixedly journalled in the continuous channel 10 for rotation about the first axis of rotation A.

The holder member 15 exhibits a cylindrical guide surface 38 with a certain diameter, designated guide diameter 39 in the following. The guide surface has a certain extent along the A-axis. In practice, 1-3 mm is sufficient. The purpose of the guide surface is to eliminate the risk of angular displacement and obliquity of the holder member 15 in relation to the first axis of rotation A.

The holder member 15 may be designed in different ways, for example with a flange, which will be described in more detail in the following.

Figure 4:
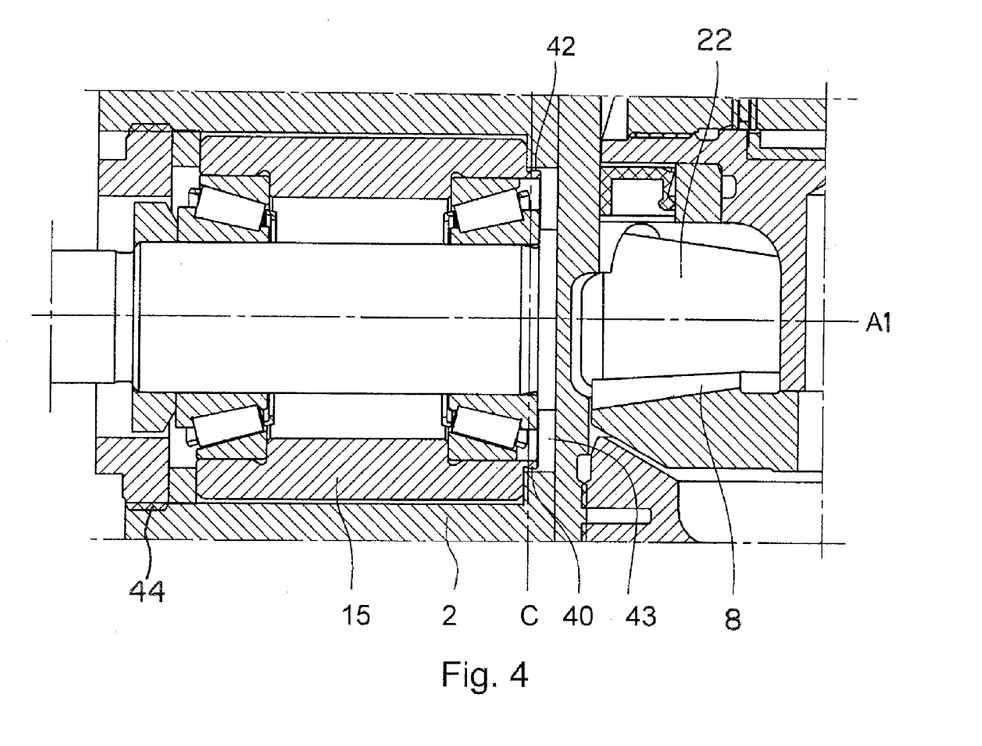
FIG. 4 is a cross section through bevel gears in FIGS. 1 and 2.

FIG. 4 is a cross section through second bevel gears 8 arranged in a wrist unit in a robot in accordance with FIGS. 1 and 2. The following description is relevant to both bevel gears 7 and 8. The backlash in the bevel gears 8 is adjusted by the possibility of displacing the holder member 15 linearly and radially along a linear movement axis C, defined above. A radial displacement of the holder member 15 entails a radial displacement of the conical gear wheel 22 in bevel gear 8. The linear movement axis C is arranged perpendicular to the axis of rotation A1 of the pinion. The holder member 15 in this embodiment is adapted to comprise a sleeve 40 which is formed with a cylindrical guide surface (38). The outer diameter of the sleeve 40 forms a guide diameter 42 (FIGS. 4, 7-9). The wrist housing 2 is formed with an internally arranged third cylindrical hole/passage 43, which will be described with reference to FIG. 5.

Figure 5:
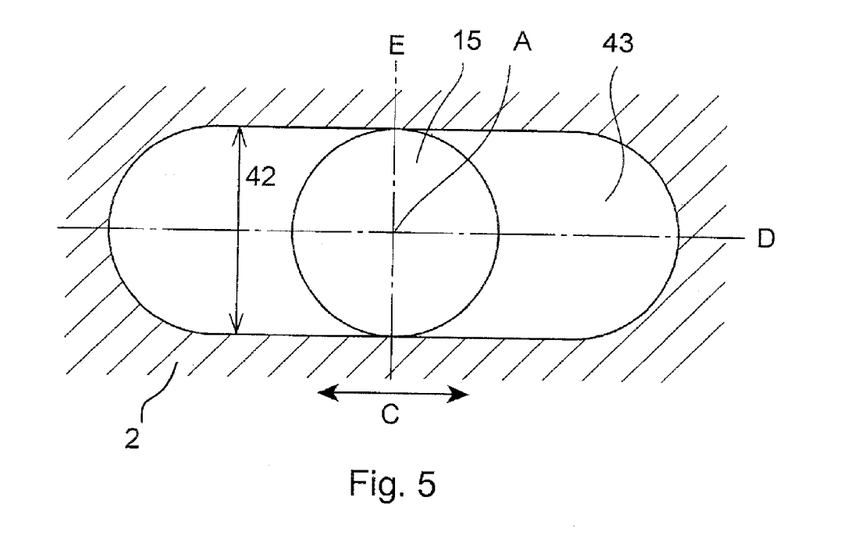
FIG. 5 is a schematic cross section through bevel gears according to the present invention.

FIG. 5 is a section through the line C, marked in the figure, and perpendicular to axis A in FIG. 4. FIG. 5 is an enlargement of a cylindrical hole/passage 43. It should be noted that the figure is not drawn to scale. The cylindrical hole/passage 43 is formed for linear guiding of the holder member 15 for displacement in either direction along the C-axis.

The symmetry axis D of the hole/passage 43 across the A-axis is parallel to the linear direction of movement C. The symmetry axis E of the hole/passage 43 is arranged perpendicular to the D-axis. The shape of the hole/passage is made with very high precision and the amount of its propagation along the symmetry axis E shall correspond to the guide diameter 42 of a sleeve 40 on a holder member 15.

A holder member 15 is displaced to the desired position. The amount of the displacement is adapted to the data of the gear in question. This means that the displacement is sufficiently great to adjust the backlash with respect to, among other things, size tolerances. When a holder member 15 has been displaced to the desired position, it is fixed with the aid of some form of fixing joint 44.

Figure 6:
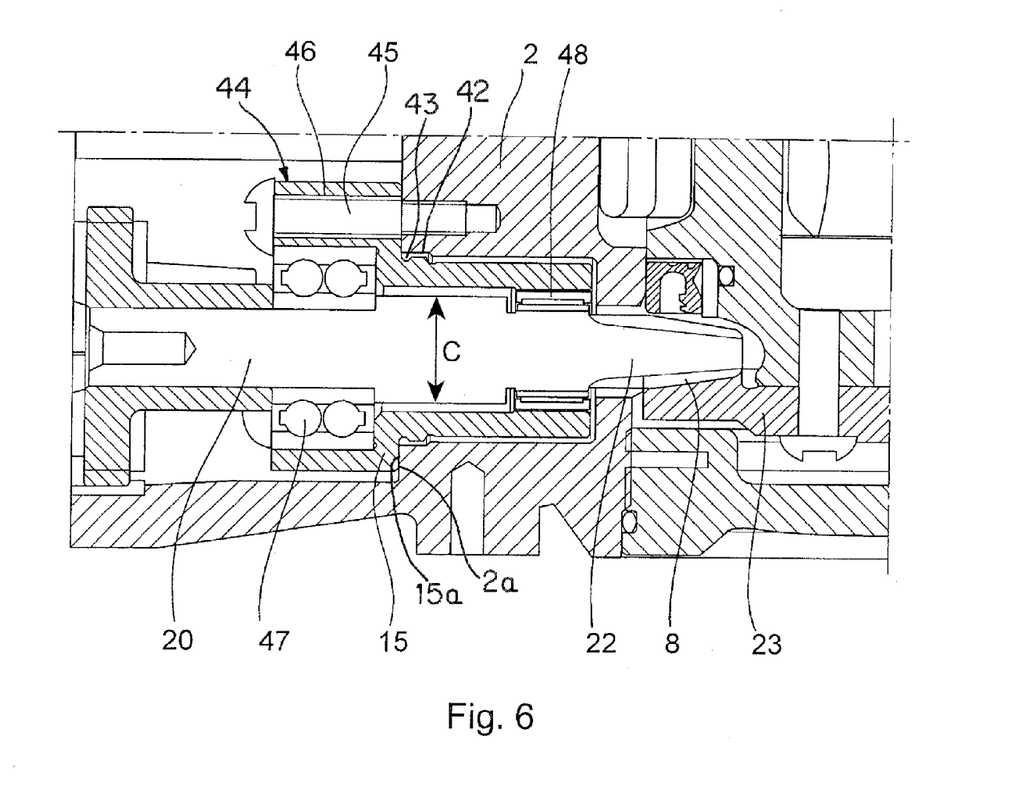
FIG. 6 is a cross section through bevel gears according to the present invention.

FIG. 6 is an embodiment that comprises a fixing joint 44 in the form of a screw joint, which comprises a plurality of fixing elements 45, only one of which is shown in the figure. The fixing elements 45 in this embodiment are screws arranged in a through-hole 46 in the flange and fixed to the wrist housing 2. Hence a conical gear wheel 22 with a shaft 20 is fixed and rotatably journalled with the aid of a holder member 15 in the desired position in the wrist housing 2, and the backlash between the first conical gear wheel 22 and a second conical gear wheel 23 in bevel gears 8 is eliminated. The (first) conical gear wheel 22 is rotatably journalled in the holder member 15 by means of a double row ball bearing 47 and a needle bearing 48. In FIG. 6, the first conical gear wheel 22 is in the form of a hypoid pinion.

Figure 7:
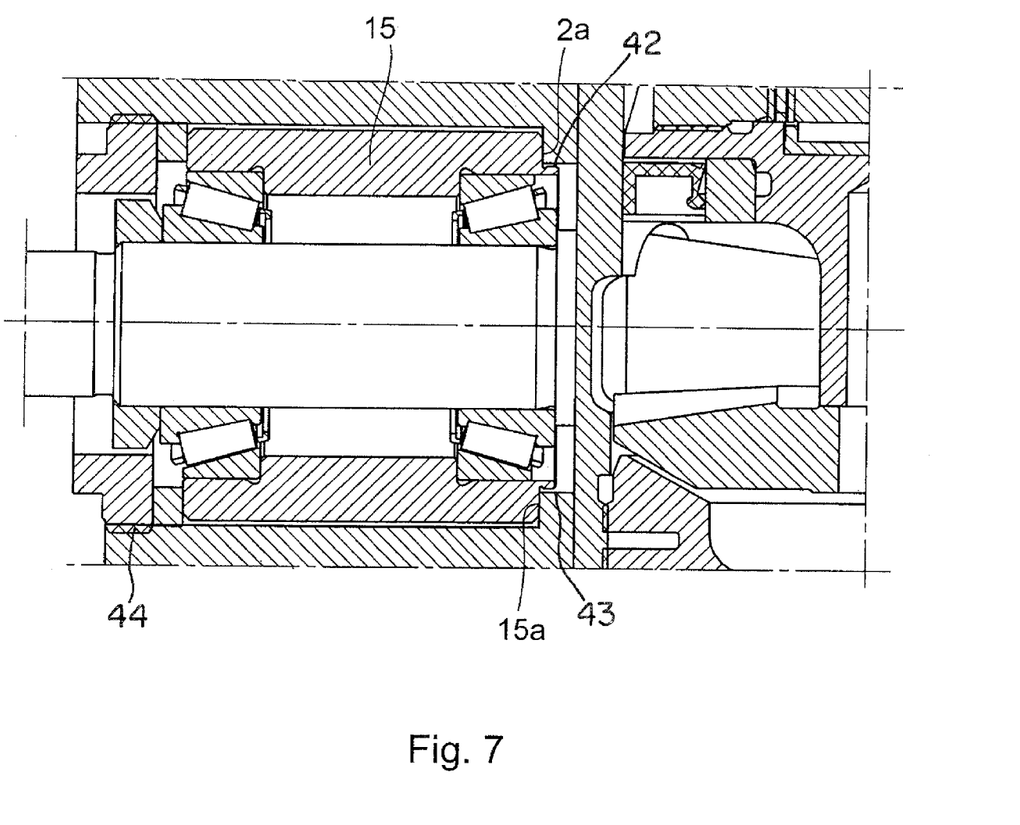
FIG. 7 is a cross section through a mounted holder device according to the present invention.
Figure 8:
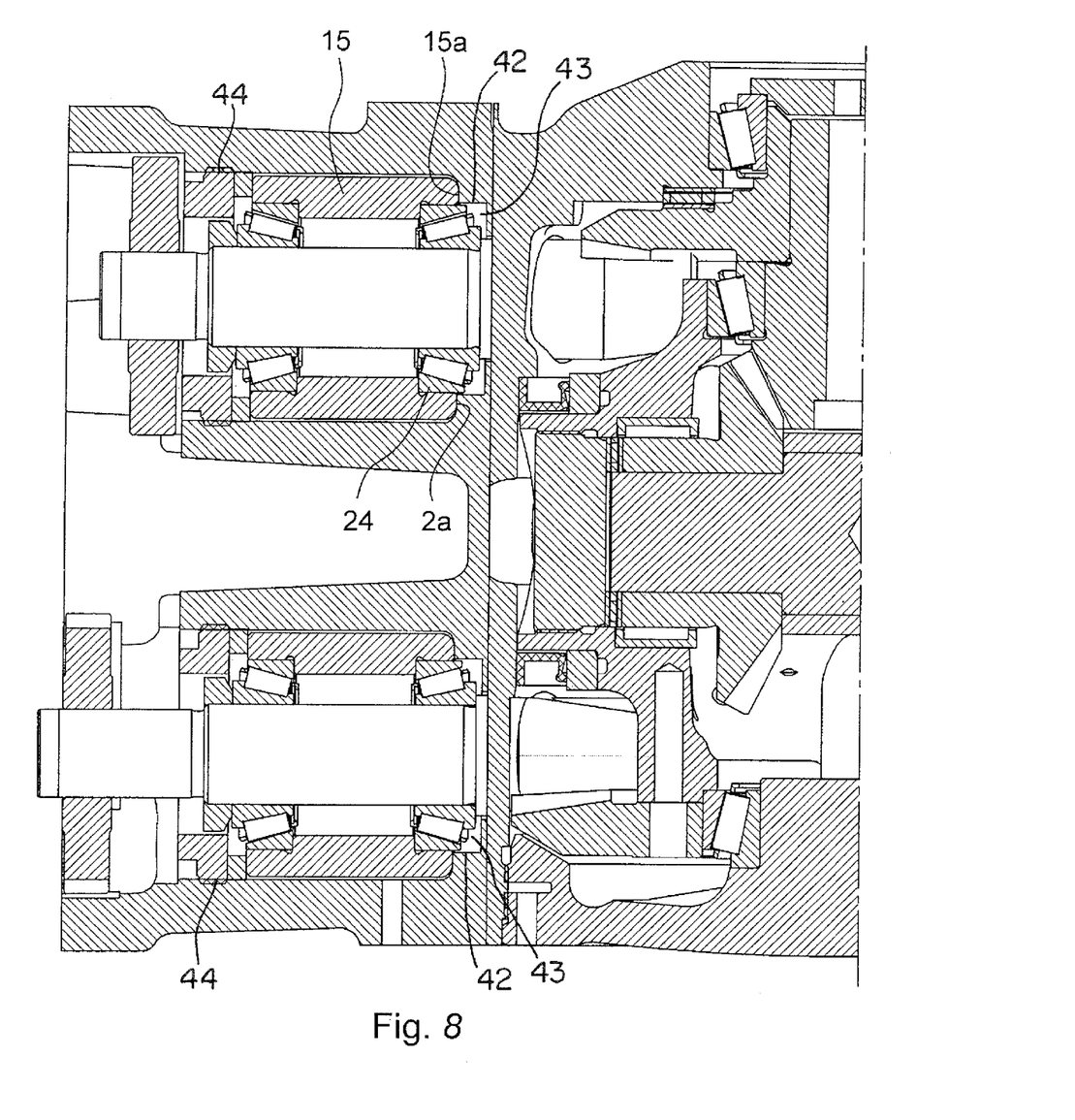
FIG. 8 is a cross section through a mounted holder device according to the present invention.

The displacement of a holder member 15 in a C-direction must take place with high accuracy to avoid obliquity of the holder member. In addition to a guide surface and a guide diameter 42, the device for elimination of backlash is formed with a supporting surface 2a. In this embodiment, the supporting surface is formed in the wrist housing, in a plane perpendicular to the direction of movement of axis C. A displacement of a holder member does not take place until a plane surface 15a arranged on the holder member makes contact with the supporting surface 2a. The displacement of the holder member takes place when a fixing joint 44, for example comprising screws, is mounted but not fully tightened. Alternatively, the fixing joint 44 may comprise an externally threaded member inserted in the housing 2 after the holder member 15, as illustrated in FIGS. 4, 7 and 8. When the threaded member is screwed into the housing 2, the holder member is fixed in the desired position.

Figures 10, 11:
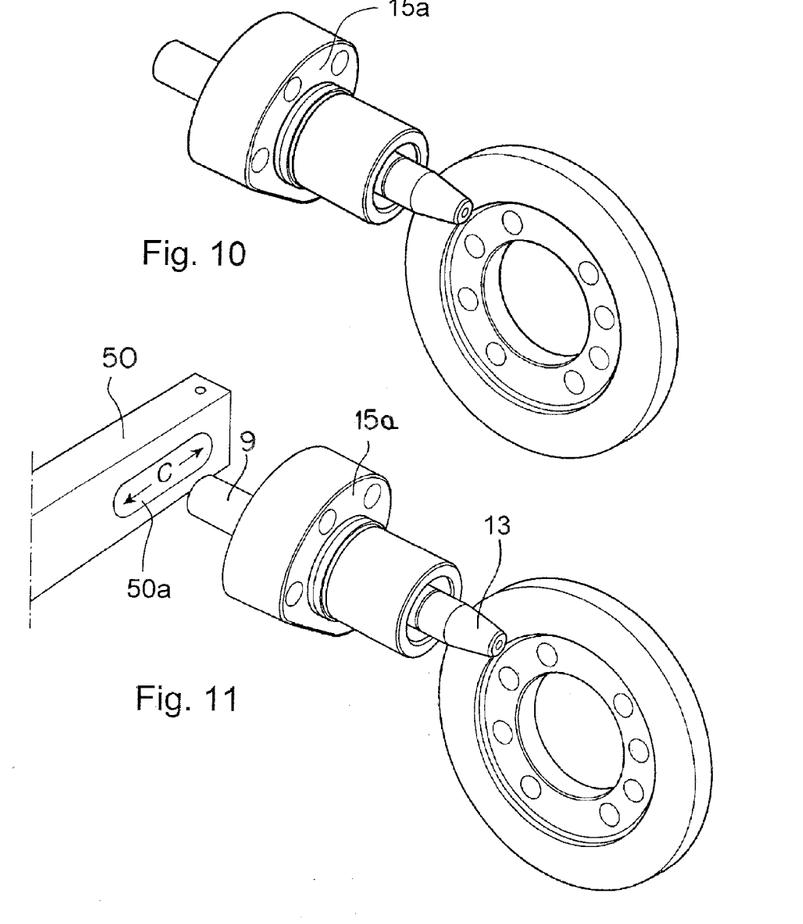

FIG. 11 is an alternative embodiment with an external tool 50 comprising a guide in the form of a hole/passageway 50a. The cylindrical hole/passageway 50a is designed for linear guiding of a shaft 9 fixedly connected to a first conical gear wheel 13, which forms part of bevel gears, in accordance with the embodiments described above. The tool is used for mounting the gearing and more particularly for displacing the shaft 9 in a controlled manner in either direction along the C-axis. It should be noted that the figure is not drawn to scale. The design of the hole/passageway 50a is made with very high precision and the extent of its propagation across the C-axis constitutes the guide diameter 42 (FIG. 5) as defined according to the above.

FIG. 8 is part of FIG. 1 or 2, where a surface 15a on the holder member 15 during mounting is adapted to make contact with a supporting surface 2a arranged in the robot wrist housing 2. Upon a displacement of the holder member 15, the movement takes place while the surface 15a on the holder makes contact with the supporting surface 2a. In this embodiment, the bearing 24 comprises the guide diameter 42 defined above.

Figure 9:
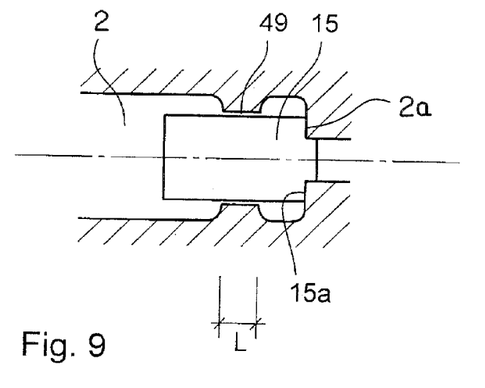
FIG. 9 is a cross section through a wrist housing with a shrunk portion according to the present invention, FIG. 10 corresponds to FIG. 3.

FIG. 9 is an embodiment with a holder member 15 formed with a surface 15a. During mounting, the surface 15a is adapted to make contact with a supporting surface 2a arranged in a robot wrist housing according to the above. Upon a displacement of the holder member 15, the movement takes place while the surface 15a on the holder makes contact with the supporting surface 2a. In this embodiment, a hole/passageway in the wrist housing, along a section L in the longitudinal direction, is formed with a shrunk portion 49. In this embodiment, the shrunk portion 49 of the wrist housing comprises the guide diameter 42 defined according to the above.

FIG. 10 is identical with FIG. 3 and the holder member comprises the surface 15a for making contact with a supporting surface in the wrist housing.

FIG. 11 is an alternative embodiment with an external tool 50 comprising a guide in the form of a cylindrical hole/passageway 50a. The cylindrical hole/passageway 50a is designed for linear guiding of a shaft 9 fixedly connected to a first conical gear wheel 13, which forms part of bevel gears, in accordance with the embodiments described above. The tool is used for mounting the gearing and more particularly for displacing the shaft 9 in a controlled manner in either direction along the C-axis. It should be noted that the figure is not drawn to scale. The design of the hole/passageway 50a is made with very high precision and the extent of its propagation across the C-axis constitutes the guide diameter 42 as defined according to the above.

Figure 12:
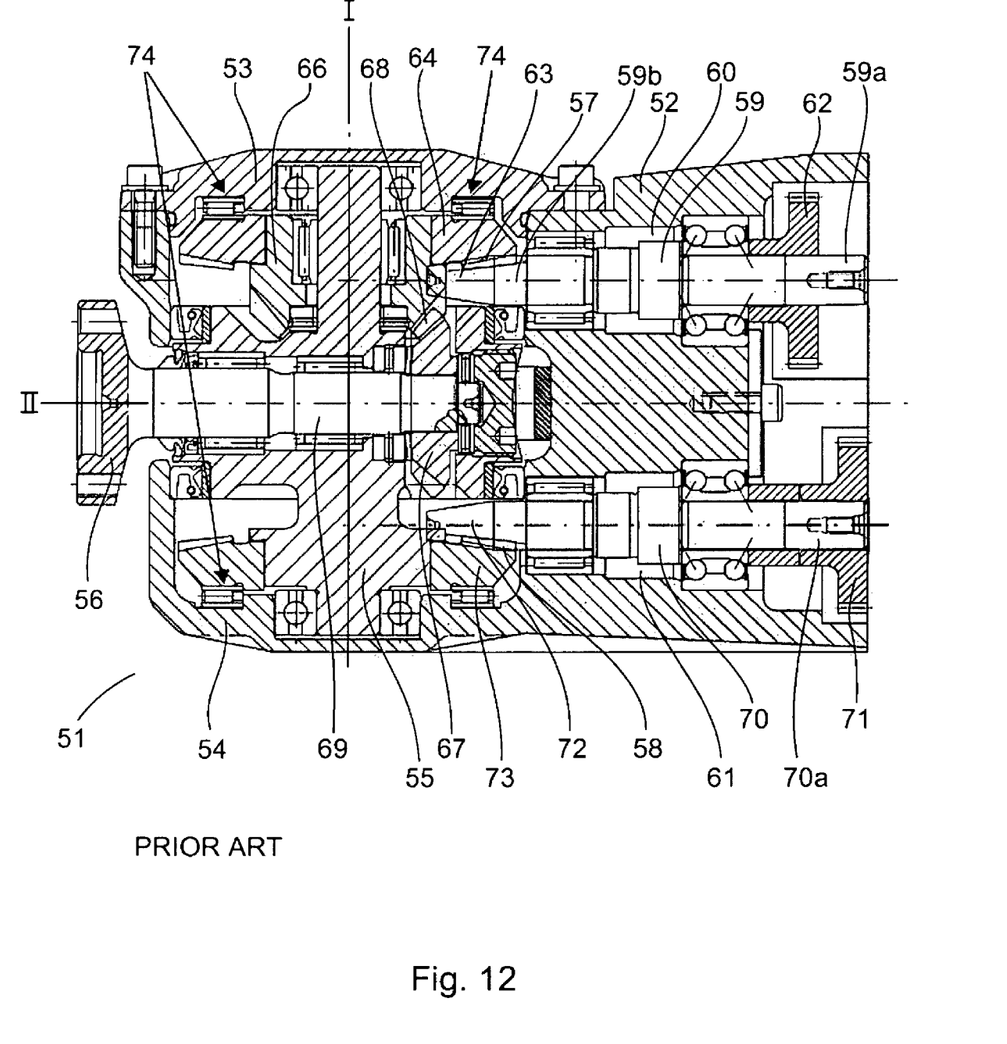

FIG. 12 is a prior art wrist for an industrial robot, which in principle comprises an outer fork-shaped wrist housing 52 with two fork branches 53, 54. The wrist housing 52 accommodates a so-called tilt housing 55 journalled for rotation about a first axis of rotation I. The tilt housing supports, in a manner known per se, a turn disc 56 rotatably journalled about a second axis of rotation II, on which turn disc a robot tool may be mounted (not shown). The first axis of rotation I is arranged perpendicular to the second axis of rotation II. The wrist comprises first bevel gears 57 for transmitting a rotary motion to the turn disc 56, said gears being described in detail below. The wrist further comprises second bevel gears 58 for transmitting a rotary motion to the tilt 55, which is also described in detail below.

For transmitting the rotary motion to the turn disc 56, a first secondary drive shaft 59 is rotatably journalled in the wrist housing 52, said drive shaft extending through a first through-hole/a channel 60 arranged in the longitudinal direction of the housing in parallel with the axis of rotation II of the turn disc. The first secondary drive shaft 59, which is axially and radially journalled across a first double row angular contact ball bearing, has an inlet end 59a on which is fixedly arranged a first cylindrical gear wheel 62, which engages with a cylindrical gear drive at the end of a first primary drive shaft (not shown), which may be inserted into the wrist housing, in the robot arm. The second, inner end 59b of the secondary drive shaft is an outlet end which is formed as a first conical gear wheel 63 designed as a hypoid pinion. The first conical gear wheel 63, the hypoid pinion, is adapted to engage with a second conical gear wheel 64 designed as a hypoid wheel. The second conical gear wheel 64 is rotatably journalled about the first axis I, perpendicular to the longitudinal axis of the first secondary drive shaft 59 and located on the outside of the first conical gear wheel 63, viewed from the intersectional point of the first I and second II axes of rotation. The first 63 and second 64 conical gear wheels form the first bevel gears 57, which in the embodiment shown is a hypoid gearing. In the hub of the second conical gear wheel 64, a third conical gear drive 66 is rigidly attached. This gear drive 66 in turn engages with a fourth conical gear wheel 67 that is rotatably journalled in the tilt housing and rigidly connected to the shaft 69 of the turn disc. The third 66 and fourth 67 gear wheels form third bevel gears 68.

For transmitting the rotary motion to the tilt 55, a second secondary drive shaft 70 is rotatably journalled in the wrist housing 52 in a similar manner, said drive shaft 70 extending through a second through-hole/a channel 61 arranged in the longitudinal direction of the housing in parallel with the axis of rotation II of the turn disc. The second secondary drive shaft 70, which is axially and radially journalled across a second double row angular contact ball bearing, has an inlet end 70a on which is fixedly arranged a second cylindrical gear wheel 71, which engages with a cylindrical gear drive at the end of a second primary drive shaft (not shown), which may be inserted into the wrist housing, in the robot arm. The second, inner end 70b of the second secondary drive shaft 70 is an outlet end which is formed as a fifth conical gear wheel 72 designed as a hypoid pinion. The fifth conical gear wheel 72, the hypoid pinion, is adapted to engage with a sixth conical gear wheel 73 designed as a hypoid wheel. The sixth conical gear wheel 73 is fixedly mounted in the tilt housing 55 and rotatably journalled about the first axis I, perpendicular to the longitudinal axis of the second secondary drive shaft 70 and located on the outside of the fifth conical gear wheel 72, viewed from the intersectional point of the first I and second II axes of rotation. The fifth 72 and sixth 73 conical gear wheels form the second bevel gears 58, which in the embodiment shown is a hypoid gearing.

Thus, for transmitting rotary motion to the tilt, a second primary drive shaft is arranged in the robot arm (not shown), and the rotary motion is thus transmitted via the second cylindrical gear wheel 71 to the second secondary drive shaft 70, which in turn, via the second bevel gears 58, sets the tilt housing 55 and hence also the turn disc 56 in rotation about the axis I. FIG. 5 is/shows the tilt 55 in a neutral position, where the second axis of rotation II is coaxial, or parallel, to the centre axis of a primary drive shaft and the longitudinal axis about which the actual robot arm is able to rotate.

Backlash in the bevel gears described above is adjusted with spacers 74, also called shims.

The wrist corresponds, in principle, to the embodiment in FIGS. 1 and 2 with the exception of the device for elimination of backlash.

What is claimed is:

1. An industrial robot bevel gearing with a housing comprising:
    a first conical gear wheel with an axis of rotation (A) of the first conical gear wheel;
    a second conical gear wheel with an axis of rotation (I), which forms a right angle with the axis of rotation (A) of the first conical gear wheel;
    a first drive shaft having a longitudinal length which is fixedly arranged with the first conical gear wheel;
    a first device for adjusting the backlash in the bevel gearing, said first device comprising a first holder member;
    said first holder member receives and rotatably journals the first drive shaft by means of contact bearing members disposed between an inner surface of the first holder member and an outer surface of the first drive shaft, and is arranged displaceable in a direction (C), which is parallel to the axis of rotation (I) of the second conical gear wheel;
    said first gear wheel is displaceable in the direction (C) in parallel with the axis of rotation (I) of the second conical gear wheel;
    wherein the first holder member is guided for linear displacement in the direction (C) in a passage formed in the housing and extending along a length of said first drive shaft and being formed for linear guiding of the first holder member, and by means of a fixing joint is fixed in a desired position in which a backlash is adjusted.

2. The industrial robot bevel gearing according to claim 1, wherein the contact bearing members comprise at least one of the following: double row angular contact ball bearings, double row ball bearings and needle bearings.

3. The industrial robot bevel gearing according to claim 1, wherein a supporting surface is formed in the housing, and wherein a surface on the first holder member during mounting is adapted to make contact with the supporting surface upon displacement of the first holder member.

4. The industrial robot bevel gearing according to claim 1, wherein the gearing between the first conical gear wheel and the second conical gear wheel is a hypoid gearing.

5. The industrial robot bevel gearing according to claim 1, wherein the first conical gear wheel is a pinion.

6. The industrial robot bevel gearing according to claim 1, wherein the first holder member has a continuous channel adapted to receive and rotatably journal the first drive shaft.

7. The industrial robot bevel gearing according to claim 1, further comprising a turn disc shaft coupled to a turn disc which rotates about an axis of rotation (II), wherein said second conical gear wheel of the bevel gearing is coupled to said turn disc shaft via a third conical gear wheel and a fourth conical gear wheel, thereby transmitting a rotary motion to said turn disc about the axis of rotation (II) of the turn disc that is parallel to the axis of rotation (A) of the first conical gear wheel.

8. The industrial robot bevel gearing according to claim 7, further comprising a second industrial robot bevel gearing having:
    a fifth conical gear wheel with an axis of rotation (A1);
    a sixth conical gear wheel with an axis of rotation (I), which forms a right angle with the axis of rotation (A1) of the fifth conical gear wheel;
    a second drive shaft having a longitudinal length which is fixedly arranged with the fifth conical gear wheel;
    a second device for adjusting the backlash in the bevel gearing, said second device comprising a second holder member;
    said second holder member receives and rotatably journals the second drive shaft by means of contact bearings, and is arranged displaceable in a direction (C), which is parallel to the axis of rotation (I) of the sixth conical gear wheel;
    said fifth gear wheel is displaceable in a radial direction (C) in parallel with the axis of rotation (I) of the sixth conical gear wheel;

wherein the second holder member is guided for linear displacement in the direction (C) in a passage extending along a length of said second drive shaft and being formed for linear guiding of the second holder member, and by means of a fixing joint is fixed in a desired position in which a backlash is adjusted.

9. The industrial robot bevel gearing according to claim 8, further comprising a tilt housing which is fixedly arranged with the sixth conical gear wheel of the bevel gearing, thereby transmitting a rotary motion to said tilt housing about the axis of rotation (I) of the sixth conical gear wheel.

10. The industrial robot bevel gearing according to claim 8, wherein the axes of rotation (A, A1) of the first and fifth conical gear wheels of the two bevel gearing assemblies are arranged parallel to each other.

11. The industrial robot bevel gearing according to claim 8, wherein the axes of rotation (I) of the second and sixth conical gear wheels of the two bevel gearing assemblies coincide.

12. The industrial robot bevel gearing according to claim 1, wherein the passage being formed for linear guiding of the first holder member has a first symmetry axis (D) being parallel to the direction (C) of movement and has a second symmetry axis (E) being arranged perpendicular to the first symmetry axis (D), and wherein the extension of the passage along the second symmetry axis (E) corresponds to a guide diameter of a sleeve part on the first holder member.

13. The industrial robot bevel gearing according to claim 12, wherein the sleeve part of the first holder member holds the contact bearing members that rotatably journal the first drive shaft.

14. A method for adjusting the backlash in an industrial robot bevel gearing with a housing and comprising a first conical gear wheel with an axis of rotation (A) and a second conical gear wheel with an axis of rotation (I), which forms a right angle with the axis of rotation (A) of the first conical gear wheel, and comprising a drive shaft with a longitudinal length, and which is fixedly arranged with the first conical gear wheel, and further comprising a device for adjusting the backlash in the bevel gearing, said device comprising a holder member, characterized by, providing a holder member with a channel extending along a length of the drive shaft;

journaling the drive shaft in the channel by means of contact bearing members disposed between an inner surface of the holder member and an outer surface of the drive shaft;

displacing the first gear wheel with its drive shaft in a radial direction (C) that is parallel with the axis of rotation (I) of the second conical gear wheel;

guiding the holder member for linear displacement in the direction (C) in a passage being formed in the housing for guiding of the holder member;

fixing the drive shaft by means of a fixing joint in a desired position in which a backlash is adjusted.

15. The method according to claim 14 wherein the first gear wheel is displaced and fixed rotatably such that the backlash between the first and second gear wheels is eliminated.

16. The method according to claim 14 wherein backlash is adjusted in a first and a second industrial robot bevel gearing of an industrial robot wrist.

17. The method according to claim 14 wherein a first industrial robot bevel gearing for transmitting a rotary motion to a turn disc about an axis of rotation (II) that is parallel to the axis of rotation (A) of the first conical gear wheel, and a second industrial robot bevel gearing for transmitting a rotary motion to a tilt housing about the axis of rotation (I) of the second conical gear wheel are provided.

18. The method according to claim 14, wherein the contact bearing members comprise at least one of the following: double row angular contact ball bearings, double row ball bearings and needle bearings.

\* \* \* \* \*